United States Patent [19]

Murakami et al.

[11] 3,929,767

[45] Dec. 30, 1975

[54] PROCESS OF PRODUCING SEMI-SYNTHETIC PENICILLIN

[75] Inventors: Masuo Murakami, Tokyo; Akio Koda, Hoya; Mutsuo Takashima, Kawagoe; Etuo Takagi; Ichiro Sakoh, both of Tokyo; Hideya Matsuda, Urawa; Tsutomu Suzuki, Tokyo, all of Japan

[73] Assignee: Yamanouchi Pharmaceutical Co., Ltd., Tokyo, Japan

[22] Filed: Nov. 9, 1972

[21] Appl. No.: 305,007

[30] Foreign Application Priority Data
Nov. 16, 1971 Japan.............................. 46-91642
Feb. 23, 1972 Japan.............................. 47-19075

[52] U.S. Cl............................... 260/239.1; 424/271
[51] Int. Cl.²....................................... C07D 499/04
[58] Field of Search.................... 260/243 C, 239.1

[56] References Cited
UNITED STATES PATENTS

| | | |
|---|---|---|
| 3,499,909 | 3/1970 | Weissenburger et al........ 260/243 C |
| 3,575,970 | 4/1971 | Weissenburger et al........ 260/243 C |
| 3,809,699 | 5/1974 | Ishimaru ........................ 260/243 C |

FOREIGN PATENTS OR APPLICATIONS 2,126,037  12/1971  Germany

*Primary Examiner*—Nicholas S. Rizzo
*Attorney, Agent, or Firm*—Burgess Ryan and Wayne

[57] ABSTRACT

A process for the production of semi-synthetic penicillin is disclosed. This process comprises reacting natural penicillin with a phosphorous halide to provide an iminohalide compound. The resulting iminohalide compound is reacted with a lower alkanol to obtain an iminoether compound and reacting said iminoether compound with a carboxylic acid followed by treating the condensation product with water or alcohol. These compounds are useful as antibacterials.

1 Claim, No Drawings

PROCESS OF PRODUCING SEMI-SYNTHETIC PENICILLIN

The present invention relates generally to a process of producing semi-synthetic penicillins and more particularly it relates to a novel process of producing semi-synthetic penicillins represented by the formula

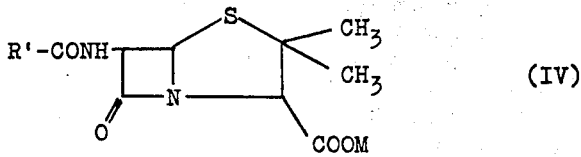

wherein R' represents an organic residual group and M represents a hydrogen atom or an alkali metal atom. The novel compositions of the present invention are obtained by reacting as penicillin represented by the formula

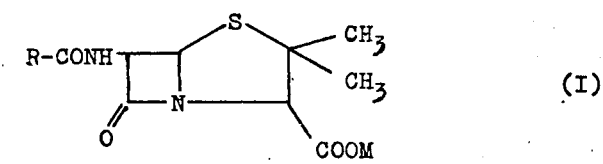

wherein RCO represents an organic acyl group of natural penicillin with a phosphorus halide to provide the acid anhydride of penicillin represented by the formula

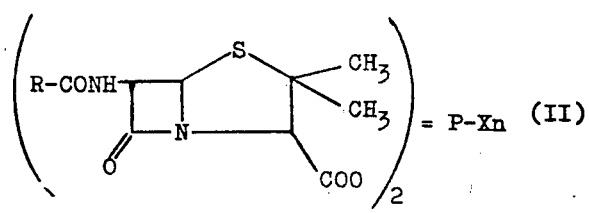

wherein RCO has the same significance as above and X represents a halogen atom and n represents an integer of 1 or 3, reacting the acid anhydride of penicillin with a phosphorus halide in an inert solvent to provide an iminohalide compound, reacting the iminohalide compound with a lower alcohol to provide an iminoether compound, condensing the iminoether compound with a carboxylic acid represented by the formula $$R' - COOH \quad (III)$$

wherein R' has the same significance as above, or a reactive derivative thereof followed by, treating the resulting product with water or an alcohol.

Semi-synthetic penicillins is generally medicaments prepared from natural penicillins and are characterized by highly desirable properties some of which are different from natural penicillin, in that the penicillin nucleus is not destroyed by penicillinase and also the synthetic penicillins are effective against gram negative bacteria and gram positive bacteria.

The semi-synthetic penicillins include ampicillin, carbenicillin, oxacillin, cloxacillin, etc.

Procedures for producing the semi-synthetic penicillin, are disclosed in Japanese patent publication Nos. 1432/'64 and 8353/'65; South African Pat. No. 2927/'67; British Pat. No. 873,049 and French Pat. No. 1,393,250 wherein 6-aminopenicillanic acid is produced by biologically deacylating natural penicillin or chemically deacylating an ester of natural penicillin and then the 6-aminopenicillanic acid is acylated. Also, German Offenlegungsschrift No. 2,062,925 discloses the process in which natural penicillin is made to react with phosphorus trichloride to provide a mixed anhydride and the mixed anhydride is reacted with a phosphorous halide to provide the iminohalide. The iminohalide is then reacted with an alcohol to provide the iminoether and the imino-ether is finally hydrolysed to 6-amino-penicillanic acid. However, the known processes described above have objectionable features since the 6-aminopenicillanic acid is difficult to handle due to its unstability and because of its limited solubility in organic solvents, it must be formed as an intermediate product. Further, the reaction rate in the acylation of the 6-aminopenicillanic acid is generally low, and finally, the isolation of the desired product is difficult.

Thus, to avoid the objectionable features of the prior art procedures, a process has been developed as disclosed in Belgian Pat. Nos. 684,288 and 710,202 in which an ester of natural penicillin is biologically (en-zymatically) deacylated to provide the ester of 6-aminopenicillanic acid, or an ester of natural penicillin is reacted with a phosphorous halide to provide an iminohalide compound and the iminohalide compound is then reacted with an alcohol to provide the iminoether. The imino-ether is chemically deacylated by hydrolysis to form the ester of 6-aminopenicillanic acid, the ester is acylated, and then the acylated product is hydrolyzed to provide the desired semi-synthetic penicillin. Although the improved processes may overcome the aforesaid difficulties in that no 6-aminopenicillanic acid is formed, the biological deacylation employed in the above processes is characterized by the following difficulties;

1. miscellaneous undesirable bacteria are intermixed in the product and the destruction of the penicillin nucleus by penicillinase must be prevented,
2. the activity of enzyme must be maintained throughout the whole process,
3. the starting material must be used in a low concentration and consequently a long period of time is required to complete the process and
4. a small amount of protein remains in the semi-synthetic penicillin produced by each of such processes, which becomes an allergen and causes harmful side effects.

Moreover, the conventional processes shown above of producing semi-synthetic penicillin by using an ester of 6-aminopenicillanic acid formed by a chemical method requires a considerable number of troublesome steps including the step of isolating the intermediate products throughout the process and hence such processes are not commercially feasible.

The inventors, however, have succeeded in obtaining semi-synthetic penicillins without isolating the intermediate product from the above-mentioned natural penicillin of the formula (I) by reacting the natural penicillin of the formula (I) with a phosphorus halide to provide the acid anhydride thereof of the formula (II), reacting the acid anhydride with a phosphorus halide in the presence of a tertiary amine in an inert solvent to provide the iminohalide compound of the formula (II)', reacting the iminohalide compound with a lower alcohol to provide the iminoether compound of the formula (II)'', reacting the iminoether compound with a acid having the formula R'—COOH or a reactive derivative of the acid, followed by treating the product with water or an alcohol.

The advantages of this invention mentioned above are that the semi-synthetic penicillin is produced with the formation of neither 6-aminopenicillanic acid nor the ester of 6-aminopenicillanic acid which requires esterification and deesterification, the steps of isolating and purifying the intermediate products as in the above-mentioned known process are unnecessary and hence the desired semi-synthetic penicillins can be produced from the ester of natural penicillin in one reaction bath. Because the procedure in the present process is quite simple and the desired product can be obtained in a short step, the process of this invention is economically as well as industrially feasible. Also, in the process of this invention, the desired product can be obtained in a high yield and in high purity.

Further, the use of a low cost phosphorus halide as the protecting group for the carboxyl group is especially suitable for the industrial manufacturing of semi-synthetic penicillin.

The RCO group of the penicillin of the aforesaid formula (I) used as the starting material in this invention is an organic acyl group forming a known natural penicillin and the group R includes an alkyl group, an aryl group, an aralkyl group, a cycloalkyl group, a heterocyclic group, including substituents thereof. Typical examples of the group R are the heptyl group, phenoxymethyl group, 2-thienylmethyl group, 2-furylmethyl group, and the like.

Ordinary, as the starting material in the process of this invention, there are available the inexpensive natural penicillins of the formula (I) wherein R is a benzyl group or a phenoxymethyl group such as penicillin G or penicillin V which may be preferably used.

The R'CO group of the formula (III) is an organic acyl group different from the RCO group of the formula (I) and the R' is an organic residual group in which the carbon atom directing bonded to C=O has 0 or 1 hydrogen atom such as an aliphatic hydrocarbon group or an aromatic hydrocarbon group. Illustratively the α-azidobenzyl group, 2,6-dimethoxyphenyl group, ethylxanthogenemethyl group, 1-(1H-4,-5,6,7,-tetrahydro-1,3-diazepin-2-ylthio)methyl group, 1-amino-1-(3-ethynyl)methyl group, 1-amino-(1,4-hexadienyl)-methyl group, α-carboxybenzyl group, 1-carboxy-1-(3-thienyl)methyl group, α-aminobenzyl group, α-amino-p-hydroxybenzyl group, 2-ethoxynaphthyl group, 1-amino-3-cyclopentenyl group, 1-aminocyclohexyl group, α-sulfonylbenzyl group, 3-(2,6-dichlorophenyl)-5-methyl-4-isothiazolyl group, 1-methylthio-2-(o-chlorophenyl)-vinyl group, α-(o-chlorobenzylideneiminooxy)benzyl group, p-guanidinophenyl group, 1-guanidino-1-(3-thienyl)methyl group, N-benzyl-1,2,3,4-tetrahydroisoquinoline-1-yl group, and the like.

The reaction of the process of this invention is assumed to proceed as shown in the following equations;

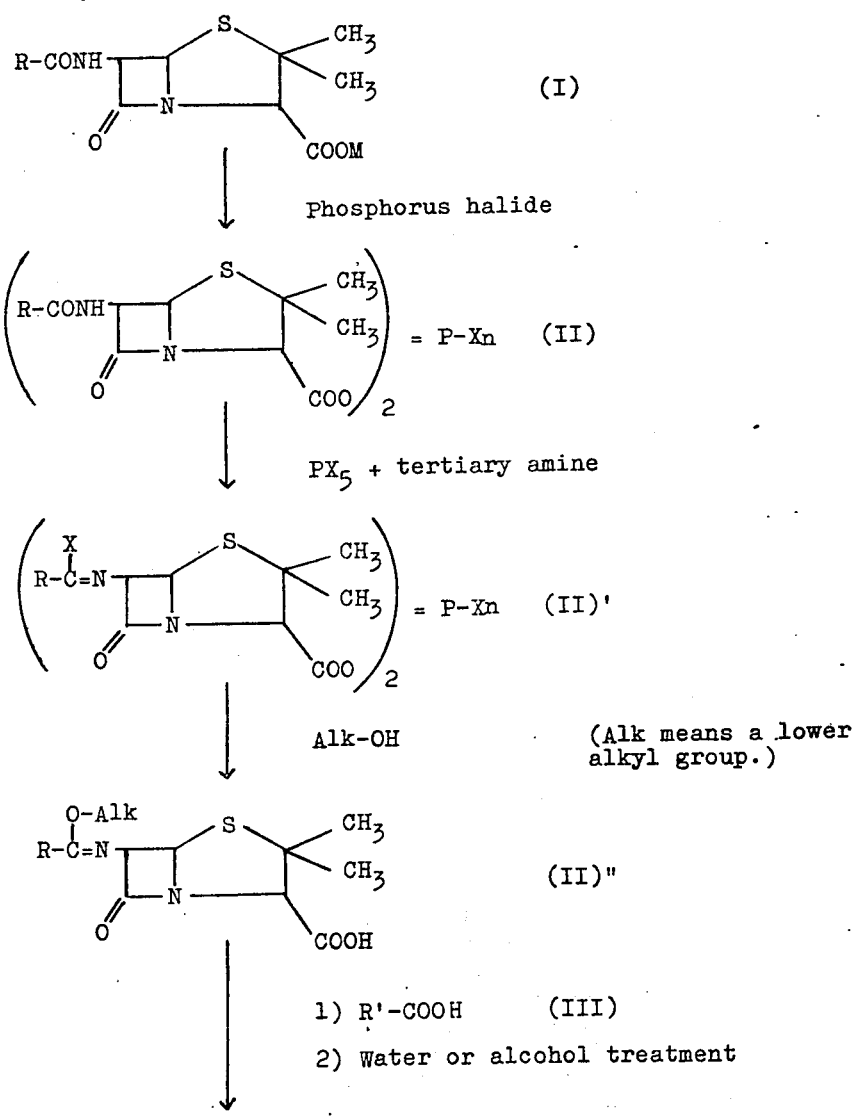

-continued

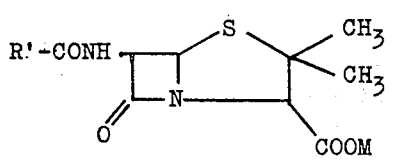

(In the formulae, RCO, R', M, X and n are of the same significance as above.)

In the process of this invention, the preparation of the acid anhydride of the natural penicillin of the formula (I), which is the starting material, is effected by reacting an alkali metal salt of the natural penicillin such as benzylpenicillin with 0.5–1 molar of a phosphorus halide in an inert solvent in the presence of a base.

As inert solvents, organic solvents such as toluene, dichloromethane, dichloroethane, trichloroethylene etc. are most suitable, and as a base, pyridine, dimethylaniline, isoquinoline etc. can be used and suitably a, weak basic tertiary amine.

As phosphorus halides, phosphorus trichloride, phosphorus tribromide, phosphorus pentachloride etc. are mentioned and when the phosphorus trichloride is applied, the reaction is conducted under cooling preferably, 0° to −5°C for 30–60 minutes.

The base which is added in the reaction mixture hold the hydrogen halide which is generated in this and the following reaction steps and accordingly, prevents the cleavage of the β-lactam ring by strong acidity. The amount of the base added is preferably 5–10 molar to the phosphorus halide used in this and the following reaction steps.

In these reactions, the application of 1.5–2 molar phosphorus pentachloride to the benzyl penicillin results in the simultaneous formation of the mixed anhydride and iminohalide.

Then, the acid anhydride of the penicillin of the formula (II) thus obtained is reacted with a phosphorus halide in an inert solvent in the presence of a tertiary amine. As the inert solvent used in this reaction, there are illustrated such inert organic solvents, as toluene, chloroform, dichloroethane, dichloromethane, trichloroethylene, etc. Also, as tertiary amines, there may be used such tertiary amines as pyridine, N,N-dimethylaniline, and triethylamine but it is preferable to use such aromatic tertiary amines as N,N-dimethylaniline. As the phosphorus halide, there are illustrated phosphorus pentachloride, phosphorus pentabromide, phosphorus oxy-chloride, phosphorus trichloride, etc., but the use of phosphorus pentachloride is particularly preferable. When phosphorus pentachloride is used, the reaction is conducted under cooling, preferably at temperatures of from 0° to −30°C.

The tertiary amine used in this reaction contributes in preventing the destruction of the penicillin nucleus by strong acid since it ties up the hydrochloric acid which is produced as a by-product as the reaction proceeds. It is preferable that the amount of the teritary amine added should be 3–5 mols per mol of a phosphorus halide such as phosphorus pentachloride. Also, it is preferable to use the phosphorus halide in an amount which is slightly in excess of the starting material.

Then, the iminohalide compound thus obtained is, without being isolated from the reaction mixture, reacted with a lower alcohol to provide an iminoether compound. As the lower alcohol, such lower aliphatic alcohols as methanol, ethanol, n-propanol, etc., are usually used. It is preferable to use the lower alcohol in an excessive amount to the raw material. It is also preferable that the reaction be conducted at almost the same temperature as that of the reaction involving the production of the iminohalide compound.

The iminoether compound contained in the reaction mixture obtained above is acylated, without removing the iminoether that is, to a treatment of liberating the amino group at the 6-position by hydrolyzing the iminoether compound by reacting it with a carboxylic acid of the formula R'—COOH or a reactive derivative of the acid, such as an acid halide, an acid anhydride, a mixed anhydride, an active ester, and N-carboxy anhydride.

For example, when an acid chloride hydrochloride is used as the acylating agent, it is preferable that the amount of the acid chloride hydrochloride be an equimolar amount or a slightly excessive molar amount to the starting material and also the reaction be conducted at a low temperature which is almost the same as that in the previous reaction. Moreover, it is further preferable for the reaction to proceed smoothly to add a tertiarry amine such as pyridine, N,N-dimethylaniline as an acid bonding agent as in the above-mentioned case.

By the above reaction, an N-acyl addition compound is formed and the compound is decomposed into the semi-synthetic penicillin of the formula (IV) by a water treatment or by a remaining lower alcohol when an excessive amount of the lower alcohol is employed in the case of the formation of the imino-ether.

In case of decomposing the above compound by the water treatment, the isolation of the semi-synthetic penicillin of the formula (IV) may be conducted simultaneously. For example, the reaction mixture containing the organic solvent obtained in the previous reaction step is stirred vigorously together with an aqueous sodium chloride solution or after adding water to the reaction mixture, a saturated amount of sodium chloride is added to the mixture followed by stirring vigorously, whereby the water-soluble impurities are removed from the organic solvent phase.

The semi-synthetic penicillin thus formed may be isolated from the reaction product by an operation conventionally employed in the synthesis of penicillin. For example, the product is extracted with acidic water, the pH of the aqueous solution thus obtained is adjusted to the iso-electric point of the synthetic penicillin, and then is concentrated to deposit the product as the crystal. Also, after extracting the product with ether, an alkali metal salt such as a sodium salt of an organocarboxylic acid such as 2-ethylhexanic acid, is added and the synthetic penicillin is then isolated as the alkali metal salt thereof. Or, further, after extracting the product with ethyl acetate, the synthetic penicillin is isolated as the alkali metal salt as in the above procedure.

Now, the invention will be illustrated in the following examples.

EXAMPLE 1

3.72g of benzyl penicillin potasssium salt are suspended in 20ml of dichloromethane to which has been added 5ml of N-dimethyl aniline and the mixture is cooled to 0° to −5°C. A solution of 1.1g of the phosphorus trichloride contained in 5ml of dichloromethane is added dropwise at that temperature to the suspension within 15 minutes with stirring and stirred for another half an hour.

The reaction solution is cooled to −10° to −15°C, 2.5g of phosphorus pentachloride is added, while stirring, at the same temperature for 1½ hours.

A mixture of 2.1ml of triethylamine and 20ml of methanol kept at about −15°C is added dropwise within 15 minutes and stirred for 2½ hours to yield a solution of iminoether. To the solution are added 7.0ml of N,N-dimethyl aniline and 2.5g of D(-)-α-phenylglycyl chloride hydrochloride are added at portions three times within 30 minutes with cooling at −30° to −35°C and stirring. After stirring at that temperature for 1½ hours, the mixture was allowed to stand overnight at −20 to −25°C.

3ml of N-dimethyl aniline are added to the reaction solution followed by adding 20ml of cold water, and the mixture is shaken thoroughly at 0° to −5°C, allowed to stand for a while and the water layer is separated from the layer of dichloromethane. The dichloromethane layer is extracted further with 10ml of cold water and combined with the above water layer. 15ml of dichloromethane are added to the aqueous solution and about 1.6ml of concentrated aqueous ammonia are added dropwise while cooling with ice and stirring to adjust the pH-value to about 6. The water layer is separated from the dichloromethane layer and 4.2g of amino G-acid potassium salt are added to the water layer to dissolve the same.

A concentrated hydrochloric acid is added dropwise to the solution with ice-cooling and stirring to adjust the pH-value to 1.6. After stirring for about 2 hours, the separated crystals are filtered and washed with water and acetone to yield 4.95g of ampicillin amino G-acid salt as white crystals. Portions of the ampicillin amino G-acid salt are added with stirring to a mixture of 10ml of the liquid anion exchanger Amberlite LA-2 (Organo Co.), 30ml of methyl isobutyl ketone, 1ml of acetic acid and 7.5ml of water and stirred at room temperature for 1½ hours. The separated crystals are filtered, washed with cold water and acetone and then dried to yield 2.2g of ampicillin trihydrate.

Yield: 55% Melting point: 198°–200°C (with decomposition) $(\alpha)_D^{20} = +252°$ (c=1, water).

EXAMPLE 2

7.8g of benzyl penicillin potassium are suspended in a solution of 50ml of dichloromethane and 10ml of dimethyl aniline and 7.8g of phosphorus pentachloride are added gradually with cooling at −20° to −15°C. After stirring for 2 hours, the resulting transparent brown solution is kept at −20° to −25°C, a mixture of 40ml of methanol and 4.2ml of triethylamine is added dropwise and after the completion of the addition, the stirring is continued for 2 hours while keeping at −20° to −25°C. Thereafter, the liquid temperature is lowered to −30°C, 14.0ml of dimethyl aniline and 5g portions of phenylglycyl chloride hydrochloride are added several times and stirred for 2 hours while keeping the liquid temperature at −20° to −25°C. The translucent reaction solution is poured into 100ml of water, 40ml of methanol are added further and stirred for 30 minutes while keeping the solution at 0° to −5°C. After standing for a while, the water layer is separated off, a solution, which is prepared by suspending 6g of amino G-acid potassium in a small amount of cold water and adjusting the pH-value with a concentrated aqueous ammonia to 7 to dissolve the same, is added to the water layer, a concentrated hydrochlorid acid is then added to adjust the pH-value to 1.6 and the separated crystals are filtered to yield ampicillin amino G-acid salt. The ampicillin amino G-acid salt is suspended in water, an aqueous ammonia is added to dissolve at a pH-value of 7, a concentrated hydrochloric acid is added thereto to adjust the pH-value to 4.8–5.0 and the separated crystals are filtered to yield 1.1g of ampicillin trihydrate.

EXAMPLE 3

3.72g of benzyl penicillin potassium salt are suspended in 30ml of dichloromethane, 5ml of dimethyl aniline are added followed by cooling to 0° to −5°C. A solution of 0.7g of phosphorus trichloride in 5ml of dichloromethane is added dropwise and stirred for 30 minutes while keeping at 0° to −5°C. 15ml of dichloromethane are added additionally, cooled to −10° to −15°C, 2.25g of phosphorus pentachloride are added and stirred at −10° to −15°C for 1½ hours. 40ml of methanol are added, cooled to −10° to −20°C and stirred for 1½ hours. 2.5ml of dimethyl aniline are added, cooled to −20° to −25°C, 3.1g of 3-(2-chlorophenyl)-5-methyl-4-isooxazolylcarbonyl chloride are added and stirred at the same temperature for 2 hours. The reaction solution is washed five times each time with 100ml of cold water until the washing liquid shows a pH-value of 4.

0.3ml of water is added, a solution of 2.5g of sodium 2-ethylhexanoate dissolved in 10ml of acetone is added dropwise at room temperature, stirred for 30 minutes as it is and allowed to stand overnight with cooling to separate white crystals. The crystals are filtered and washed with a small amount of methylene chloride and acetone to yield 1.5g of cloxacillin monohydrate having a melting point of 170°C (with decomposition).

In the same manner, using 2.7g of 5-methyl-3-phenylisooxazole-4-carbonyl chloride instead of 3-(2-chlorophenyl)-5-methyl-4-isooxazolylcarbonyl chloride, oxacillin having a decomposition point of 188°C is obtained.

EXAMPLE 4

In the same manner as in Example 3, 2.4g of α-azido-phenylacetyl chloride instead of 3-(2-chlorophenyl)-5-methyl-4-isooxazolylcarbonyl chloride are used in the reaction, the resulting reaction solution is poured into 100ml of cold water and stirred thoroughly and the water layer is then separated from the dichloromethane layer. The dichloromethane layer is washed with 50ml of cold water and extracted twice each time with 50ml of 2% aqueous solution of sodium hydrogen carbonate. The extracts are combined and washed with 30ml of dichloromethane, then water layer is the separated off, 50ml of ether are poured thereon and 10% phosphoric acid is added dropwise with ice-cooling and stirring to adjust the pH-value of the water layer to 2. After shaking thoroughly, the ether layer is separated from the water layer. After the water layer is extracted with a further 20ml of ether, the ether layers are combined, washed twice each time with each 20ml of water and then dried with anhydrous magnesium sulfate. A 50 W/V % solution of potassium 2-ethylhexanoate in n-butanol is added dropwise until the separation of the precipitate is completed. The formed white crystals are filtered, washed with a small amount of ether and then dried to yield 2.1g of white powder crystal of α-azidobenzylpenicillin potassium.

In the same manner using compounds (III), the following compounds (IV) are obtained:

| | Compound (III) | | R' of compound (IV) | Decomp. temp. (°C) |
|---|---|---|---|---|
| A | α-carboxy phenyl acetyl chloride | 2.0g | α-carboxy benzyl | |
| B | α-phenoxy butyryl chloride | 2.4g | α-phenoxy butyryl | 195 (K-salt) |
| C | 2-biphenylyl carbonyl chloride | 2.6g | 2-biphenylyl | 182 (Na-salt) |
| D | quinoxaline-2,3-bis-carboxy anhydride | 2.4g | 3-carboxy-2-quinoxalyl | 261 (Na-salt) |

EXAMPLE 5

In the same manner as in Example 3, using 2.5g of 1-aminocyclohexane-1-carbonyl chloride hydrochloride in the reaction instead of 3-(2-chlorophenyl)-5-methyl-4-isooxazolyl carbonyl chloride, the resulting reaction solution is poured into 40ml of cold water and stirred throughly, and the water layer is then separated from the dichloromethane layer. The dichloromethane is extracted three times each time with 10ml of cold water. The extracts are combined and filtered with the addition of Perlite (by Toko Perlite Co.), a solution of 40ml of Amberlite LA-2 (Organo Co.) contained in 100ml of ligroin is shaken with the filtrate and the water layer is then separated off. After washing the water layer with 20ml of ligroin, the pH-value thereof is adjusted to 2, and it is shaken thoroughly with a solution of 2.3g of sulfosuccinic acid dioctylether sodium salt contained in 100ml of methyl isobutyl ketone. The methyl isobutyl ketone layer is separated and dried with anhydrous magnesium sulfate. When the pH-value is adjusted to 6 by adding dropwise triethylamine with ice-cooling and stirring, crystals are separated. The crystals are filtered off, washed successively with a small amount of methyl isobutyl ketone and cold water and then dried to yield 1.75g of 6-(1-aminocyclohexane-1-carbonamido)penicillanic acid monohydrate (decomposition point: 168°C).

What is claimed is:

1. A process for the production of a semi-synthetic penicillin of the formula:

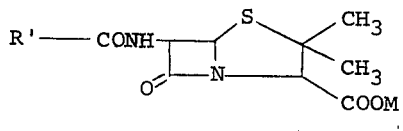

wherein R' is a member selected from the group consisting of α-azidobenzyl, α-aminobenzyl, α-carboxybenzyl, isoxazolyl substituted by methyl, isoxazolyl substituted by phenyl, isoxazolyl substituted by chlorophenyl, phenoxypropyl, biphenylyl, quinoxalyl substituted by carboxy, and aminocyclohexyl and M is a member selected from the group consisting of hydrogen and an alkali metal, which comprises contact benzyl penicillin of the formula:

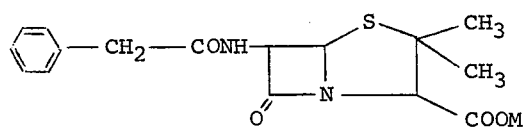

in which M is as defined in an inert solvent in the presence of a base and under cooling with 0.5 to 1 molar of a member selected from the group consisting of phosphorous trichloride, and phosphorous pentachloride to obtain an acid anhydride of penicillin of the formula:

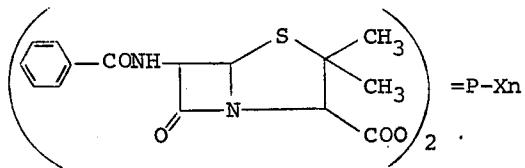

in which X is chloro and $n$ is 1 or 3, reacting said acid anhydride of penicillin with a phosphorous halide in an inert solvent in the presence of 3 to 5 mols of tertiary amine per mole of phosphorous halide in an inert solvent to obtain an iminohalide compound, reacting said iminohalide compound with a lower alkanol to obtain an iminoether compound condensing the iminoether compound with a member selected from the group consisting of R'COOH in which R' is as defined above, and the corresponding acid anhydride and acid chloride and adding the condensed product to a member selected from the group consisting of water and lower alkanol.

\* \* \* \* \*